(12) United States Patent
Giesenberg et al.

(10) Patent No.: US 6,371,684 B2
(45) Date of Patent: Apr. 16, 2002

(54) CLAMPING RING FOR CONNECTING CYLINDRICAL UNITS OF MISSILES

(75) Inventors: Peter Giesenberg, Salem; Rainer Flickinger, Ostrach/Ochenbach; Friedrich Kessler, Friedrichshafen, all of (DE)

(73) Assignee: Bodenseewerk Geratetechnik GmbH, Uberlingen/Bodensee (DE)

( * ) Notice: Subject to any disclaimer, the term of this patent is extended or adjusted under 35 U.S.C. 154(b) by 0 days.

(21) Appl. No.: 09/943,519

(22) Filed: Aug. 30, 2001

Related U.S. Application Data

(63) Continuation of application No. 09/769,040, filed on Jan. 24, 2001, now abandoned, which is a continuation of application No. 09/021,248, filed on Feb. 10, 1998, now abandoned.

(30) Foreign Application Priority Data

Feb. 14, 1997 (DE) .......................................... 197 05 712

(51) Int. Cl.[7] ................................................. F16B 1/02
(52) U.S. Cl. ................... 403/338; 403/34.1; 403/409.1; 244/3.1
(58) Field of Search ................................. 403/338, 335, 403/336, 373, 394.1, 409.1; 244/3.1, 3.24; 89/1.51, 1.53, 1.54, 1.56, 1.57, 1.58, 1.59, 1.811, 1.82, 1.83; 285/253, 420, 411

(56) References Cited

U.S. PATENT DOCUMENTS

| | | |
|---|---|---|
| 2,809,584 A | 10/1957 | Smith |
| 3,193,129 A | 7/1965 | Pflüger et al. |
| 3,215,082 A | 11/1965 | Baggs et al. |
| 3,286,630 A | 11/1966 | Salmirs et al. |
| 3,600,770 A | 8/1971 | Halling |
| 4,008,937 A | 2/1977 | Filippi |
| 5,018,768 A | 5/1991 | Palatchy |
| 5,188,400 A | 2/1993 | Riley et al. |
| 5,286,135 A | 2/1994 | James |
| 5,540,465 A | 7/1996 | Sisk |
| 5,708,232 A | 1/1998 | Nedderman, Jr. |
| 5,722,666 A | 3/1998 | Sisk |
| 5,782,499 A | 7/1998 | Gfrerer et al. |

FOREIGN PATENT DOCUMENTS

| | | |
|---|---|---|
| DE | 3 028 609 | 2/1982 |
| FR | 2 674 892 | 4/1991 |

*Primary Examiner*—Lynne H. Browne
*Assistant Examiner*—John R. Cottingham
(74) *Attorney, Agent, or Firm*—McAfee & Taft

(57) ABSTRACT

The invention relates to a clamping ring for connecting cylindrical units of a missile, which have each a circumferential projection and a flat-conical engagement surface. The clamping ring comprises a circumferential portion bent to a arc of a circle and having two ends, which can be tightened together by means of a turnbuckle. The clamping ring has cheeks along its rims. The cheeks have flat-conical engagement surfaces corresponding to the flat-conical engagement surfaces of the circumferential projections of the cylindrical units to be connected. The clamping ring extends with the cheeks over the circumferential projections of the units. In order to increase the strength of the clamping ring by suitable shaping within a predetermined space, the inner surface of the clamping ring is free from edges and guided tightly about the outer contours of the circumferential projections. Rounded circumferential recesses are provided at the transitions between this inner surface free from edges and the engagement surfaces of the cheeks in order to achieve large transition radii. The outer surface of the clamping ring has a cylindrical section and substantially conical sections in the area of the cheeks, the transition between the cylindrical section and the conical sections being rounded.

22 Claims, 4 Drawing Sheets

CLAMPING RING FOR CONNECTING CYLINDRICAL UNITS OF MISSILES

This application is a continuation of prior application Ser. No. 09/769,040, filed Jan. 24, 2001, now abandoned, which was a continuation of Ser. No. 09/021,248 filed Feb. 10, 1998, now abandoned.

BACKGROUND OF THE INVENTION

This invention relates to a clamping ring for connecting cylindrical units of missiles, which have each a circumferential projection having an outer contour and a flat-conical engagement surface. The clamping ring comprises: a circumferential portion bent substantially to an arc of a circle and having an inner and an outer surface, a first and a second front surface, a first and a second end and two rims; clamping means adapted to act on said first and second end of said circumferential portion in order to tighten said ends; a central area having an inner surface and an outer surface; a first and a second cheek extending along said rims and having flat-conical engagement surfaces corresponding to said flat-conical engagement surfaces of said circumferential projections of said cylindrical units to be connected, transitions being defined between said central area and said engagement surfaces of said cheeks; wherein: said clamping ring extends with said cheeks over said circumferential projections of said units; and said engagement surfaces of said clamping ring engage said engagement surfaces of said circumferential projections of said cylindrical units when said clamping ring is tightened.

Target-tracking missiles consist of a plurality of substantially tubular or cylindrical units, for example a seeker head, the electronical unit, the warhead and the driving mechanism. Such units are interconnected by means of clamping rings. The clamping rings are elements, which are bent approximately to an arc of a circle. The ends of the clamping ring are tightened in circumferential direction by means of a turnbuckle. At its inner side the clamping ring has cheeks along its rims. The cheeks extend inwards and the clamping ring extends with these cheeks over circumferential projections of the units to be interconnected. When the clamping ring is tightened, these circumferential projections are pulled together and attached to each other. For this purpose, the two cheeks of the clamping ring have flat-conical engagement surfaces of the inner sides facing each other. These engagement surfaces of the cheeks engage engagement surfaces on the circumferential projections provided at the units. These engagement surfaces of the circumferential projections are flat-conical corresponding to the engagement surfaces of the cheeks.

Usually the circumferential projections of the units engage each other with their front surfaces. The ends of the units can be inserted into each other. The circumferential projections on the units to be interconnected can have cylindrical peripheral surfaces having different radii. A cylindrical peripheral surface can, for example, be connected to the front surface of the circumferential projection by means of a conical surface. The circumferential projections can be provided at sections, which are displaced radially inwards relative to the cylindrical peripheral surface of the unit, such that the clamping ring extending over the projections does not substantially project beyond the peripheral surface of the missile. This is desired for aerodynamical reasons. The cheeks of the clamping ring can project differently far inwards relative to the central area of the clamping ring.

A prior art clamping ring of the type mentioned above is shaped such that, taking all tolerances of the units into consideration, the maximum outer diameter of a circumferential projection of a unit is substantially larger than the corresponding inner diameter of the clamping ring. Thus, when the clamping ring is tightened by means of a turnbuckle, the inner surface of the central area of the clamping ring does not at any place positively engage the outer surface of a circumferential projection formed on the units.

In practice it has been found, that the prior art clamping rings can break under loads occuring in practice. This can lead to serious consequences. It is not possible just to reinforce the clamping rings because of constuctive requirements, for example the shape of the circumferential projections of the units to be interconnected and the radially allowed maximum dimensions of the clamping rings.

SUMMARY OF THE INVENTION

The object of the present invention is to increase the strength of the clamping ring, taking the available space for the clamping ring into consideration, particularly the radial dimensions of the clamping ring.

According to the invention this is achieved in that the inner surface of the central area of the clamping ring is free from edges and guided tightly about the outer contours of the circumferential projections of the units, and rounded circumferential recesses are provided at the transitions between the inner surface of the central area and the engagement surfaces of the cheeks of the clamping ring in order to achieve large transition radii.

Preferably the outer surface of the clamping ring has a substantially cylindrical section in the central area and substantially conical sections in the area of the cheeks, the transition between the cylindrical section and the conical sections being rounded.

The invention is particularly based on the discovery, that overload of the clamping ring can occur in the edges on the inside between the central area of the clamping ring and the cheeks. There, the radius of curvature is small and, thus, the stresses in the material are high there. According to the present invention the inner surface of the central area is, in fact, guided as tightly as possible around the outer contours of the circumferential projections of the units, but the inner surface is smooth and continuous without edges. Thus, at one hand, the thickness of the clamping ring is made as large as possible, and, on the other hand, steps and edges are avoided, at which small radii of curvature and high material stresses can occur. Furthermore, rounded circumferential recesses are provided between the central area and the cheeks. This leads to removal of material, but the radius of curvature is increased. This reduces the specific material stresses.

In order to increase the thickness of the clamping ring without exceeding the allowed radial dimensions, in a preferred embodiment of the clamping ring the outer surface of the clamping ring has a substantially cylindrical section in the central area. From this section the outer surface continues in a rounded manner in a substantially conical section, which extends inwards to the radial front surface of the clamping ring. Thus, the outer contour of the clamping ring extends outside the outer contour of prior art clamping rings. This results in increase of the strength, without exceeding the allowed radial maximum dimensions of the clamping ring.

It has been shown, that the combination of the features of the invention leads to a considerable increase of the strength of the clamping ring. The dimensions of the clamping ring according to the present invention are such, that this clamping ring can be used instead of prior art clamping rings. Missiles can be retrofitted with the clamping rings according to the present invention without change in their design.

Further objects and features of the invention will be apparent to a person skilled in the art from the following specification of a preferred embodiment when read in conjunction with the appended claims.

BRIEF DESCRIPTION OF THE DRAWING

The invention and its mode of operation will be more clearly understood from the following detailed description when read with the appended drawings in which.

DESCRIPTION OF THE PREFERRED EMBODIMENT

Figure 1:
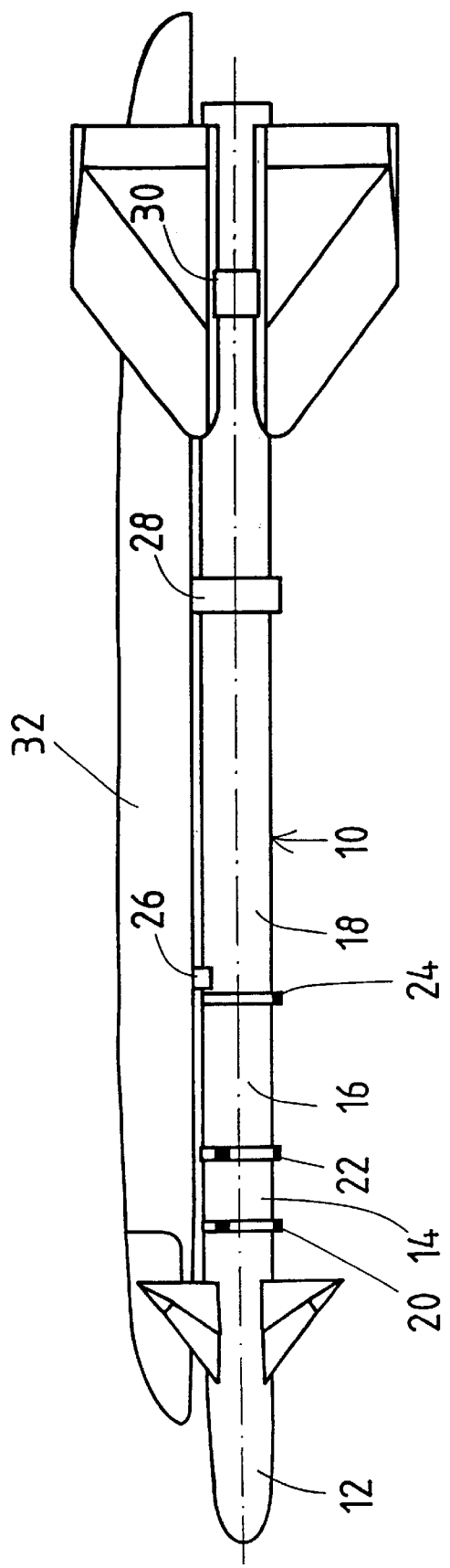
FIG. 1 shows a side view of a launcher and a target-tracking missile, individual units of the missile being interconnected by means of clamping rings.

Referring now to FIG. 1, there is shown a target-tracking missile 10 consisting of cylindrical or tubular units 12, 14, 16, 18. The units 12, 14, 16, 18 are interconnected by means of clamping rings 20, 22 and 24. The missile 10 is suspended through hangers 26, 28, 30 in a launcher 32. This is known per se and not described in detail herein.

Figure 2:
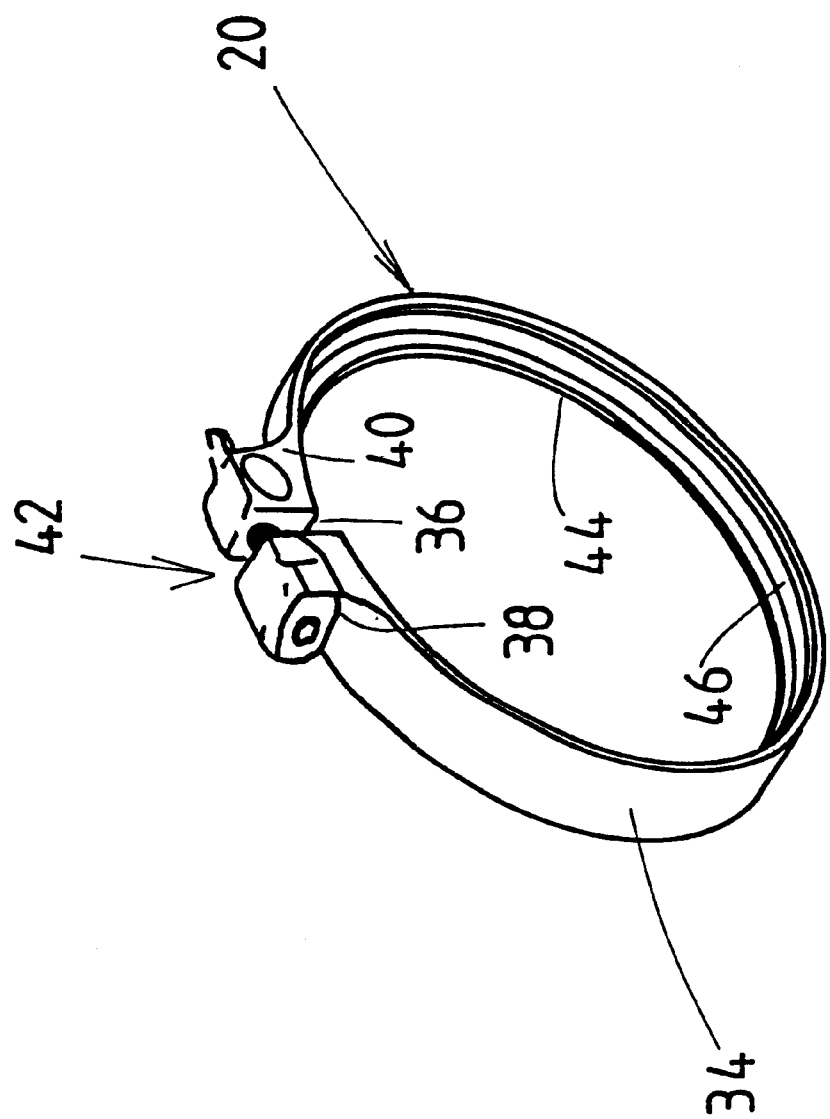
FIG. 2 is a perspective illustration of a clamping ring.

With reference to FIG. 2, there is shown a perspective illustation of a clamping ring, for example the clamping ring 20. The clamping ring 20 has a circumferential portion 34 of approximately circular arc shape. The circumferential portion 34 is divided at a location 36 and forms two ends 38 and 40. The two ends 38 and 40 can be tightened against each other by means of a turnbuckle 42. By this the clamping ring 20 is clamped around the units 12 and 14 to be interconnected. The clamping ring 20 has cheeks 44 and 46 projecting inwards and extending along its two rims. The cheeks 44 and 46 extend over circumferential projections, which are provided at the units 12 and 14 to be interconnected. This is illustrated in FIG. 3.

Figure 3:
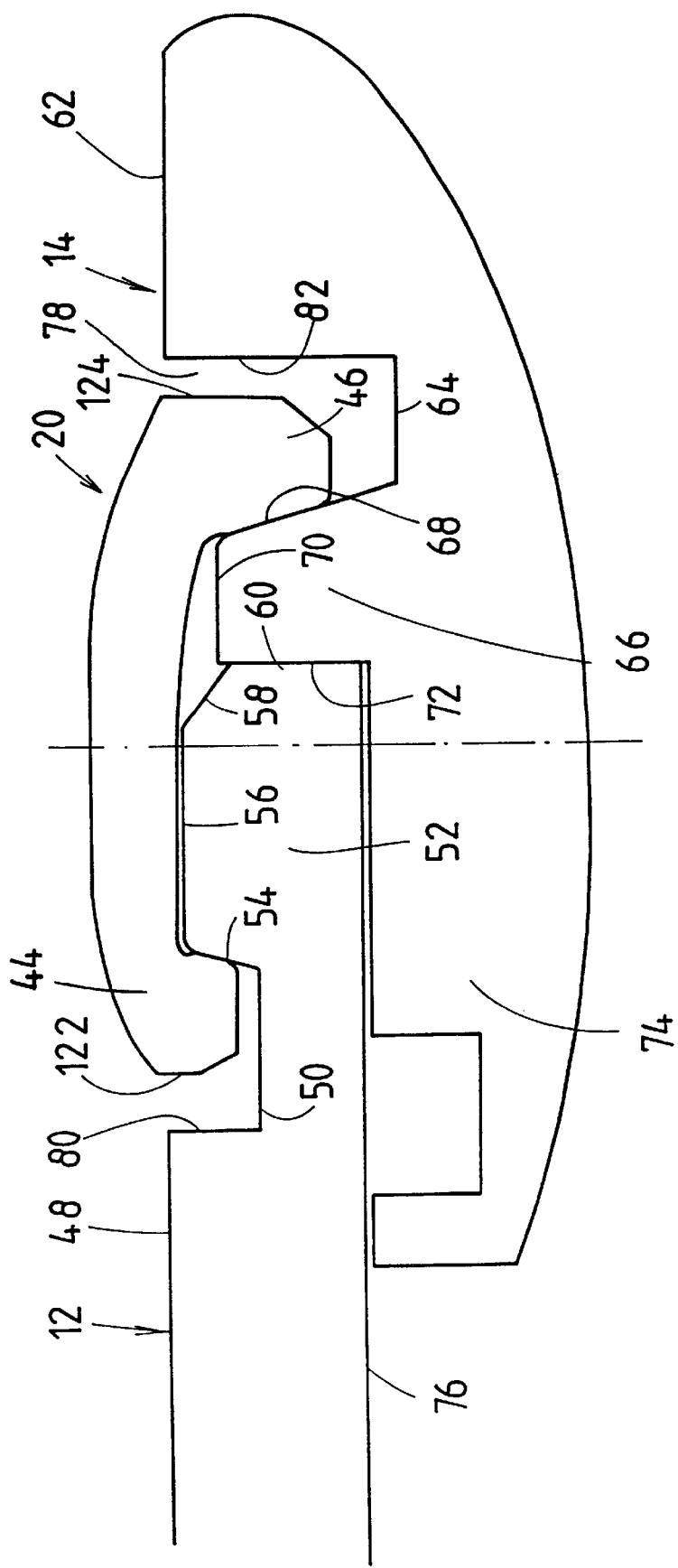
FIG. 3 shows a broken longitudinal section of adjacent portions of two units of the missile, the circumferential projections engaging each other and being held together by a clamping ring.

With reference to FIG. 3, there are shown adjacent portions of two units 12 and 14 to be interconnected by a clamping ring 20. The outer contour of the unit 12 has a cylindrical section 48. The diameter of this cylindrical section 48 corresponds to the outer diameter of the missile 10. At the end of the unit 12 facing the adjacent unit 14 the outer contour of the unit 12 extends inwards forming a cylindrical section 50. The diameter of this cylindrical section 50 is smaller than the diameter of the cylindrical section 48. From this section 50 of reduced diameter a circumferential projection 52 projects outwards. The circumferential projection 52 has a flat-conical engagement surface 54 facing the unit 12. A cylindrical circumferential surface 56 is located adjacent to the engagement surface 54. The cylindrical circumferential surface 56 is connected to a radial front surface 60 of the circumferential projection 52 through a conical connection surface 58. This front surface 60 is here at the same time the front surface of the tubular unit 12.

The outer contour of the unit 14 in FIG. 3 likewise has a cylindrical section 62. The diameter of this cylindrical section 62 corresponds to the outer diameter of the missile 10. The outer contour of the unit 14 likewise extends inwards at the end facing the unit 12 and forms a cylindrical section 64 of reduced diameter. From this cylindrical section 64 a circumferential projection 66 projects outwards. The circumferential projection 66 has a flat-conical engagement surface 68 adjacent to the cylindrical section 64. The flat-conical engagement surface 68 is inclined to the other side with respect to the inclination of engagement surface 54. In FIG. 3 the apex of the cone defining the engagement surface 54 is located to the left of the engagement surface 54 towards the unit 12. In FIG. 3 the apex of the cone defining the engagement surface 68 is located to the right of the engagement surface 68 towards the unit 14. A cylindrical circumferential surface 70 is located adjacent to the engagement surface 68. The cylindrical circumferential surface 70 extends to a radial front surface 72 of the circumferential projection 66. The diameter of the circumferential surface 70 is smaller than the diameter of the circumferential surface 56. The front surfaces 60 and 72 of the circumferential projections 52 and 66 engage each other.

In the arrangement of FIG. 3 the unit 14 extends telescopically with a projection 74 into a bore 76 of the tubular unit 12.

This design of the units results in the formation of a kind of a circumferential groove 78 between the units 12 and 14, which is limited by the radial annular surfaces 80 and 82 and the cylindrical sections 50 and 64 and into which the circumferential projections 52 and 66 extend. The clamping ring 20 is located in this circumferential groove 78. The clamping ring 20 extends with the cheeks 44 and 46 over the circumferential projections 52 and 66 and tightens the two units 12 and 14 together. The clamping ring 20 should as far as possible be accommodated in this "circumferential groove" 78. It should not extend more than a certain extent beyond the cylindrical outer contour of the missile 10. This limits the radial dimensions of the clamping ring 20.

Figure 4:
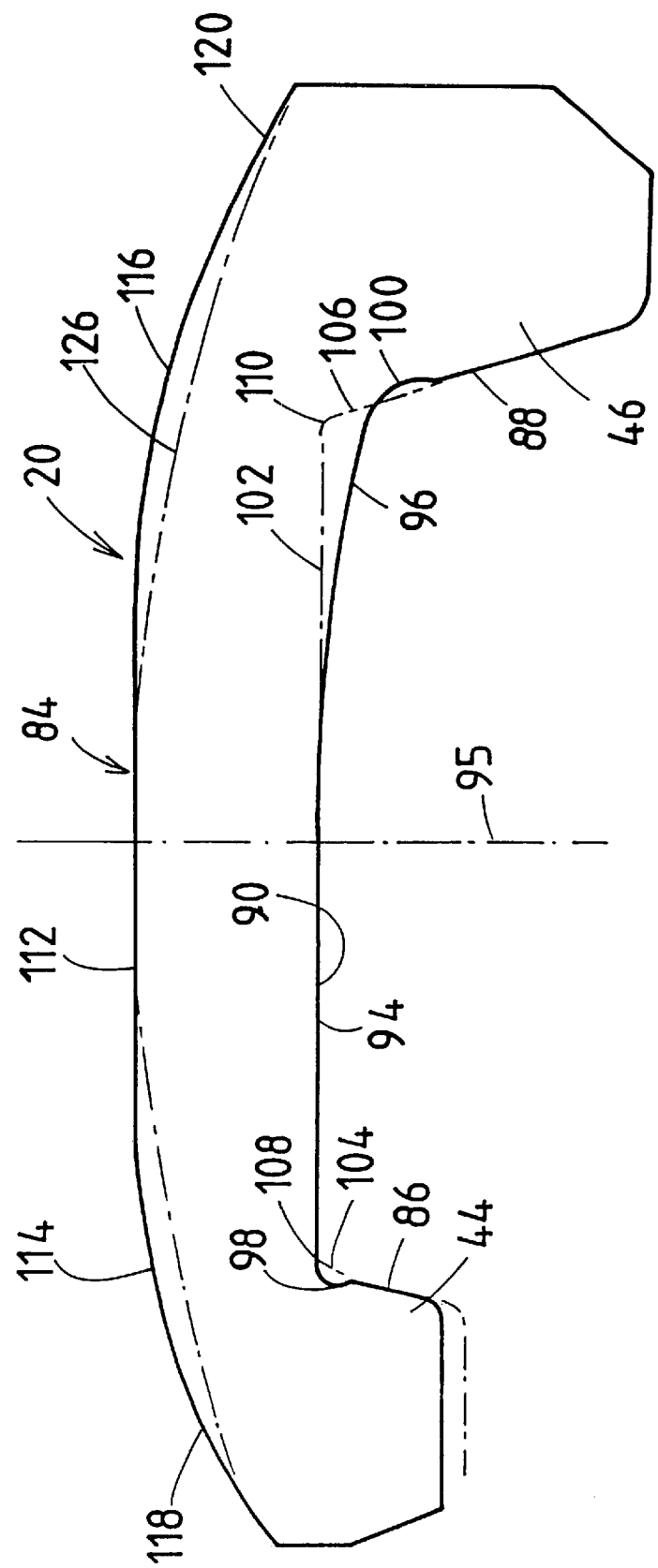
FIG. 4 shows a cross section of the clamping ring, the cross section of a prior art clamping ring being drawn with phantom lines.

As best can be seen in FIG. 4, the clamping ring 20 has a central area 84 and cheeks 44 and 46 extending inwards along the rims of the clamping ring 20. The cheek 44 has a flat-conical engagement surface 86 complementary to the engagement surface 54 of the circumferential projection 52. The cheek 46 has a flat-conical engagement surface 88 complementary to the engagement surface 68 of the circumferential projection 66. The inner surface 90 of the central area 84 of the clamping ring 20 is free from edges and guided tightly about the outer contour of the circumferential projections 52 and 66 of the units. At the described outer contour of the circumferential projections 52 and 66 the inner surface 90 has, adjacent to the cheek 44, a substantially cylindrical section 94. The section 94 extends approximately to the central plane 95 of the clamping ring 20. Tangentially adacent thereto there is a slightly concave section 96, which passes into the inner surface of the cheek 46. In order to achieve larger transition radii, rounded circumferential recesses 98 and 100, respectively, are provided at the transitions between this inner surface 90 free from edges and the engagement surfaces 86 and 88 of the cheeks 44 and 46, respectively, of the clamping ring 20.

With reference to FIG. 4, there are shown the contours of the clamping ring 20 and the contours of a prior art clamping ring drawn with phantom lines. The inner surface 102 of the prior art clamping ring is continuously cylindrical over the total width of the central area. Edges 108 and 110, respectively, having a relatively small radius of curvature are formed between the engagement surfaces 104 and 106 of the cheeks 44 and 46, respectively, and the continuously cylindrical inner surface 102. Compared hereto, the clamping ring 20 is thickened towards the cheek 46 beyond the cylindrical surface 102. This results in a more continuous transition to the engagement surface 88, the radius of curvature being additionally increased by the circumferential recess 100. The radius of curvature between the inner surface 90 and the engagement surface 86 is increased in the same way. Due to the thickening of the clamping ring 20 towards the cheek 46, the space between the clamping ring 20 and the contour of the circumferential projections 52, 66 is optimally used for reinforcement of the clamping ring 20, without edges being formed at the inner surface as is the case in another prior art embodiment of the clamping ring, in which the inner surface is stepped according to the contours of the circumferential projections.

At the outside the clamping ring 20 has a substantially cylindrical section 112 in the central area 84. The diameter of the cylindrical section 112 corresponds to the allowed maximum diameter of the clamping ring 20. The cylindrical section 112 extends almost over the total central area 84 of the clamping ring 20. Adjacent thereto in the area of the cheeks 44 and 46, the outer surface of the clamping ring 20 has convex transition surfaces 114 and 116, respectively, which pass tangentially into the cylindrical section 112. The convex transition surfaces 114 and 116 then pass into approximately conical sections 118 and 120, respectively, The sections 118 and 120 end in radial front surfaces 122 and 124 of the cheeks 44 and 46, respectively.

As can be seen from FIG. 4, the outer contour of the clamping ring 20 extends beyond the outer contour 126 of the prior art clamping ring. The cross-section of this outer contour 126 is continuously convex and approximately shaped as an arc of a circle. In this manner, the clamping ring 20 is additionally reinforced in the area of the critical transition between the central area 84 and the cheeks 44 and 46, without the allowed maximum diameter of the clamping ring 20 being exceeded.

The inner diameter of the cylindrical section 94 of the inner surface 90 of the clamping ring 20 is manufactured with such tolerances with respect to the outer diameter of the adjacent circumferential projection 52, that clamping between the clamping ring 20 and the circumferential projection 52 is only effected with the smallest outer diameter of the circumferential projection 52 and the largest inner diameter of the inner surface 90 of the clamping ring 20. Thus, neither the inner diameter of the clamping ring 20 is substantially smaller than the outer diameter of the surface 56, as is the case in the above mentioned prior art clamping ring, nor the inner diameter of the clamping ring is substantially larger than the outer diameter of the surface 56 of the outer contour as in another prior art embodiment. Thus, at one hand, problems with the fitting and engagement of the clamping ring are avoided and, at the other hand, the available space is optimally used for reinforcement of the clamping ring.

The transition radii can be cold-worked by chasing or rolling. This results in intentional stresses in the transition areas between the inner surface 90 and the engagement surfaces 86 and 88, which counteract the bending stresses when the missile and the clamping ring 20 are loaded.

The clamping ring can be manufactured as a cast part.

Furthermore, it is advantageous to provide the engagement surfaces with a dry-film lubricant. However, also a metal layer, preferably of chrome or nickel, can be provided at the engagement surfaces.

We claim:

1. A clamping ring for connecting cylindrical units of a missile, which have each a circumferential projection having an outer contour and a flat-conical engagement surface, said clamping ring comprising:

a circumferential portion bent substantially to an arc of a circle and having an inner and an outer surface, a first and a second front surface, a first and a second end and two rims;

clamping means adapted to act on said first and second ends of said circumferential portion in order to tighten said ends;

a central area having an inner surface and an outer surface; and a first and a second cheek extending along said rims and having flat-conical engagement surfaces corresponding to said flat-conical engagement surfaces of said circumferential projections of said cylindrical units to be connected, transitions being defined between said central area and said engagement surfaces of said cheeks;

wherein:

said clamping ring extends with said cheeks over said circumferential projections of said units;

said engagement surfaces of said clamping ring engage said engagement surfaces of said circumferential projections of said cylindrical units when said clamping ring is tightened;

said inner surface of said central area of said clamping ring is free from edges and guided tightly about said outer contours of said circumferential projections of said units; and rounded circumferential recesses are provided at said transitions between said inner surface of said central area and said engagement surfaces of said cheeks of said clamping ring in order to achieve large transition radii.

2. The clamping ring of claim 1, wherein said outer surface of said clamping ring has a substantially cylindrical section in said central area and substantially conical sections in the area of said cheeks, the transition between said cylindrical section and said conical sections being rounded.

3. The clamping ring of claim 1, wherein said inner surface of said central area of said clamping ring, adjacent to said first cheek of said clamping ring, has a substantially cylindrical section in the area of a largest diameter of said adjacent circumferential projection of said unit, and a substantially flat-conical section adjacent to said cylindrical section.

4. The clamping ring of claim 3, wherein the inner diameter of said cylindrical section of said inner surface is manufactured with such tolerances with respect to the outer diameter of said adjacent circumferential projection, that clamping between said clamping ring and said circumferential projection is only just effected with the smallest outer diameter of said circumferential projection and the largest inner diameter of said central area of said clamping ring.

5. The clamping ring of claim 1, wherein said transition radii are cold-worked by chasing.

6. The clamping ring of claim 1, wherein said clamping ring is manufactured as a cast part.

7. The clamping ring of claim 1, wherein said engagement surfaces of said clamping ring are provided with a dry-film lubricant.

8. The clamping ring of claim 1, wherein said engagement surfaces of said clamping ring are provided with a metal layer.

9. The clamping ring of claim 8, wherein said metal layer is chrome.

10. The clamping ring of claim 8, wherein said metal layer is nickel.

11. The clamping ring of claim 1, wherein said transition radii are cold-worked by rolling.

12. A clamping ring for connecting cylindrical units of a missile, each of the cylindrical units having a circumferential projection having an outer contour and a flat-conical engagement surface, said clamping ring comprising:
   a circumferential portion generally shaped in an arc of a circle and comprising:
      an inner surface;
      an outer surface;
      a first front surface;
      a second front surface;
      a first end;
      a second end; and
      a pair of rims;
   clamping means for clamping said first and second ends toward one another;
   a central area comprising:
      an inner surface free from edges and forming a portion of said inner surface of said circumferential portion; and
      an outer surface forming a portion of said outer surface of said circumferential portion;
   a first cheek extending along one of said rims and having a flat-conical engagement surface corresponding to one of the flat-conical surfaces of the circumferential projection of one of the cylindrical units;
   a second cheek extending along the other of said rims and having a flat-conical engagement surface corresponding to the flat-conical engagement surface of the circumferential projection of the other of said cylindrical units;
   a first transition extending between said central area and said engagement surface of said first cheek, said first transition defining a rounded circumferential recess; and
   a second transition extending between said central area and said engagement surface of said second cheek, said second transition defining a rounded circumferential recess;
   wherein, the clamping ring may be placed in a connecting position adjacent to the cylindrical units of the missile in which:
      said circumferential portion extends substantially over the circumferential projections of the cylindrical units;
      said engagement surface of said first cheek engages the engagement surface of the circumferential projection of the one of the cylindrical units when said clamping means is engaged;
      said engagement surface of said second cheek engages the engagement surface of the circumferential projection of the other of the cylindrical units when said clamping means is engaged; and
      said inner surface of said central area is positioned tightly about the outer contours of the circumferential projections of the cylindrical units.

13. The clamping ring of claim 12 wherein:
   said outer surface of said circumferential portion has a substantially cylindrical section in said central area, substantially conical sections generally aligned with said cheeks, and a rounded transition between said cylindrical sections and said conical sections.

14. The clamping ring of claim 12 wherein:
   said inner surface of said central area comprises:
      a substantially cylindrical section adapted for general alignment with the circumferential projections of the cylindrical units of the missile when the clamping ring is in the clamping position; and
      a concave section extending between the cylindrical section and said first cheek.

15. the clamping ring of claim 14 wherein an inner diameter of said cylindrical section of said inner surface has dimensional tolerances with respect to an outer diameter of the circumferential projections of the cylindrical units such that clamping between a maximum inner diameter of said cylindrical section of said inner surface and a minimum outer diameter of a corresponding circumferential projection is just effected when the clamping ring is in the connecting position.

16. The clamping ring of claim 12 wherein said recesses are cold-worked by chasing.

17. The clamping ring of claim 12 wherein said recesses are cold-worked by rolling.

18. The clamping ring of claim 12 wherein said circumferential portion, said central area, said first and second cheeks and said first and second transitions are integrally formed as a cast part.

19. The clamping ring of claim 12 further comprising a dry film lubricant disposed on said engagement surfaces of said first and second cheeks.

20. The clamping ring of claim 12 further comprising a metal layer on said engagement surfaces of said first and second cheeks.

21. The clamping ring of claim 20 wherein said metal layer comprises chrome.

22. The clamping ring of claim 20 wherein said metal layer comprises nickel.

* * * * *